United States Patent
Zhang (10) Patent No.: US 10,473,686 B2
(45) Date of Patent: Nov. 12, 2019

(54) INERTIA MEASUREMENT MODULE AND TRIAXIAL ACCELEROMETER

(71) Applicant: Goertek.Inc, Shandong (CN)

(72) Inventor: Tingkai Zhang, Shandong (CN)

(73) Assignee: Goertek Inc., Shandong (CN)

( * ) Notice: Subject to any disclaimer, the term of this patent is extended or adjusted under 35 U.S.C. 154(b) by 171 days.

(21) Appl. No.: 15/538,230

(22) PCT Filed: Jul. 23, 2015

(86) PCT No.: PCT/CN2015/084970
§ 371 (c)(1),
(2) Date: Jun. 21, 2017

(87) PCT Pub. No.: WO2016/101611
PCT Pub. Date: Jun. 30, 2016

(65) Prior Publication Data
US 2017/0363655 A1   Dec. 21, 2017

(30) Foreign Application Priority Data

Dec. 25, 2014 (CN) .......................... 2014 1 0826551
Dec. 25, 2014 (CN) .......................... 2014 1 0826621
Jan. 30, 2015 (CN) .......................... 2015 1 0050223

(51) Int. Cl.
*G01P 15/125* (2006.01)
*G01P 15/18* (2013.01)

(52) U.S. Cl.
CPC ............ *G01P 15/125* (2013.01); *G01P 15/18* (2013.01)

(58) Field of Classification Search
CPC ........... G01P 15/125; G01P 2015/0802; G01P 2015/0831; G01P 2015/0845;
(Continued)

(56) References Cited

U.S. PATENT DOCUMENTS 6,122,965 A * 9/2000 Seidel ..................... G01P 15/18
                                                                    73/514.32
8,205,498 B2    6/2012 Hsu et al.
(Continued)

FOREIGN PATENT DOCUMENTS

CN   101458262 A   6/2009
CN   101738496 A   6/2010
(Continued)

OTHER PUBLICATIONS

International Searching Authority, International Search Report (ISR) and Written Opinion for International Application No. PCT/CN2015/084970, dated Nov. 3, 2015, 12 pages, State Intellectual Property Office of the P.R.C.

*Primary Examiner* — Peter J Macchiarolo
*Assistant Examiner* — Irving A Campbell
(74) *Attorney, Agent, or Firm* — Alston & Bird LLP (57) ABSTRACT

An inertia measurement module and three-axis accelerometer, comprising a first pole piece (4) located on a substrate and a mass block (1) suspendingly connected above the substrate via elastic beams (11, 12); the elastic beams (11, 12) includes a first elastic beam (12) and a second elastic beam (11), two ends of the second elastic beams (11) being connected to an anchor point (6) of the substrate, two ends of the first elastic beam (11) being connected to the mass block (1); a center of the first elastic beam (12) and/or the second elastic beam (11) deviates from a center of gravity of the mass block (1); the mass block (1) is further provided with a first movable electrode (9) and a second movable electrode (10) in a Y-axis and an X-axis direction; the movement of one axis in a plane of the inertia measurement module cannot be affected by an eccentric structure feature, such that both X-axis movement and Y-axis movement are linear movements, thus not intensifying an inter-axis coupling, and also not reducing displacement of a mass block on the X-axis and the Y-axis, thus improving capacitance detection precision.

9 Claims, 5 Drawing Sheets

(58) Field of Classification Search
CPC ..... G01P 2015/0848; G01P 2015/0851; G01P 15/0802
USPC ...................................................... 73/514.32
See application file for complete search history.

(56) References Cited

U.S. PATENT DOCUMENTS

| | | |
|---|---|---|
| 2004/0154400 A1 | 8/2004 | Johnson et al. |
| 2013/0104654 A1* | 5/2013 | Classen ................. G01P 15/125 73/514.16 |
| 2013/0228013 A1 | 9/2013 | Tanaka |
| 2013/0255382 A1 | 10/2013 | Tanaka |
| 2014/0216156 A1 | 8/2014 | Sakai |
| 2015/0041927 A1* | 2/2015 | Geisberger ............ B81B 3/0027 257/415 |

FOREIGN PATENT DOCUMENTS

| | | |
|---|---|---|
| CN | 102193002 A | 9/2011 |
| CN | 103292830 A | 9/2013 |
| CN | 103364588 A | 10/2013 |
| CN | 104459203 A | 3/2015 |
| CN | 104459204 A | 3/2015 |
| CN | 104597287 A | 5/2015 |
| JP | 2007-139505 A | 6/2007 |

* cited by examiner

INERTIA MEASUREMENT MODULE AND TRIAXIAL ACCELEROMETER

CROSS REFERENCE TO RELATED APPLICATIONS

This application is a national stage application, filed under 35 U.S.C. § 371, of International Application No. PCT/CN2015/084970, filed Jul. 23, 2015, which claims priority to Chinese Application No. 201410826621.5 filed Dec. 25, 2014, Chinese Application No. 201410826551.3 filed Dec. 25, 2014, and Chinese Application No. 201510050223.3 filed Jan. 30, 2015, the contents of all of which as are hereby incorporated by reference in their entirety.

BACKGROUND

The present invention relates to the field of micro-electromechanical systems (MEMS), and more particularly, relates to a micro-electromechanical inertial measurement module. The present invention further relates to a triaxial accelerometer.

A micro-electromechanical accelerometer is an MEMS technology-based inertial device for measuring the linear movement acceleration of an object in movement. It has the characteristics of being small in size, high in reliability, low in cost and suitable for mass production. Thus, it has a broad market prospect and can be applied to the fields of consumer electronics, aerospace, automotives, medical equipment and weapons.

At present, the triaxial accelerometer is usually implemented through two manners. The first manner is a patchwork method, in which three single-axis structures are combined together or a dual-axis structure and a single-axis structure are combined to implement measurement of three axial accelerations. The second manner adopts a single structure to implement the measurement of the three axial accelerations. In the single-structure implementation solution, generally, z-axis acceleration is measured by an eccentric structure. As for this solution, not only the z-axis detection movement utilizes the eccentricity of the structure, but also the detection movement of a certain axis (e.g., an x-axis or a y-axis) in the plane will be affected by the eccentricity of the structure, such that the movement of the structure is actually a swinging movement, rather than a linear movement. On one hand, this movement increases the coupling between axes, and on the other hand, the change amount of a capacitor is reduced, thereby greatly reducing the detection accuracy. Moreover, during the detection of y-axis acceleration, the actual movement may be a swinging movement, rather than a linear movement due to this characteristic of the structure, further reducing the detection accuracy.

BRIEF SUMMARY

In order to solve the problems in the prior art, the present invention provides an inertial measurement module which is simple in structure and high in measurement accuracy.

In order to achieve the above object, the technical solution of the present invention is to provide an inertial measurement module, comprising: a substrate; a first pole piece, as a lower electrode, located on the substrate; a mass block suspended above the substrate, wherein an upper electrode for forming a Z-axis detection capacitor with the first pole piece is arranged on the mass block; and elastic beams configured to connect the substrate with the mass block, wherein the elastic beams comprise a first elastic beam located in the X-axis direction and a second elastic beam located in the Y-axis direction and cross-connected with the first elastic beam; two ends of the second elastic beam are connected with anchor points on the substrate and two ends of the first elastic beam are connected with the mass block, or the two ends of the first elastic beam are connected with the anchor points on the substrate and the two ends of the second elastic beam are connected with the mass block; the center(s) of the first elastic beam and/or the second elastic beam are/is deviated from the gravity center of the mass block; the mass block is further provided with a first movable electrode and a second movable electrode in the Y-axis and X-axis directions respectively; and the substrate is provided with a first fixed electrode configured to form a Y-axis detection capacitor with the first movable electrode, and a second fixed electrode configured to form an X-axis detection capacitor with the second movable electrode.

Preferably, there is one first elastic beam located on a center line in the X-axis direction of the mass block, and the second elastic beam is deviated from a center line in the Y-axis direction of the mass block.

Preferably, there are two first elastic beams symmetrically distributed along the center line in the X-axis direction of the mass block, and the second elastic beams are deviated from the center line in the Y-axis direction of the mass block.

The present invention further provides a triaxial accelerometer, comprising: two structurally symmetric inertial measurement modules, and a connecting beam for connecting mass blocks in the two inertial measurement modules.

Preferably, the connecting beam comprises transverse beams located in the X-axis direction, and a longitudinal beam located in the Y-axis direction; one end of the longitudinal beam is connected with the transverse beams, and the other end thereof is connected with the side wall of the corresponding mass block; and the longitudinal beam and second elastic beams are in the same straight line.

Preferably, a reinforcing beam for connecting the two transverse beams is further provided, wherein the second elastic beams in the two inertial measurement modules are symmetrically distributed with respect to the reinforcing beam.

Preferably, there are two reinforcing beams parallel to each other, and the two reinforcing beams and the transverse beams form a rectangular frame.

Preferably, the triaxial accelerometer further comprises a cant beam located inside the rectangular frame.

The present invention further provides a triaxial accelerometer, comprising: two structurally symmetric inertial measurement modules, wherein the first elastic beams are deviated from center lines in the X-axis direction of mass blocks; a connecting beam for connecting two sides of the mass blocks in the two inertial measurement modules, respectively, wherein the connecting beam comprises transverse beams located in the X-axis direction and longitudinal beams located in the Y-axis direction, and one end of the longitudinal beam is connected with the transverse beams, and the other end thereof is connected with the side wall of the corresponding mass block; and reinforcing beams for connecting the two transverse beams, wherein second elastic beams in the two inertial measurement modules are symmetrically distributed with respect to the reinforcing beams.

Preferably, there are two reinforcing beams parallel to each other, and the two reinforcing beams and the transverse beams form a rectangular frame.

Preferably, the triaxial accelerometer further comprises: a cant beam located in the rectangular frame.

In the inertial measurement module provided by the present invention, the movement of a certain axis (X-axis and Y-axis) in a plane is not affected by the eccentricity of the structure, so that the movement of the X-axis or the Y-axis is a linear movement, without increasing the coupling between axes. On the other hand, the displacement amount of the mass block in the X-axis axis and Y-axis directions cannot be reduced, thereby improving the detection accuracy of a capacitor.

DETAILED DESCRIPTION OF VARIOUS EMBODIMENTS

In order to make the solved technical problems, the technical solutions and the technical effects of the present invention easier to understand, the specific embodiments of the present invention will be further described with reference to the accompanying drawings hereinafter.

Embodiment I

Figure 1:
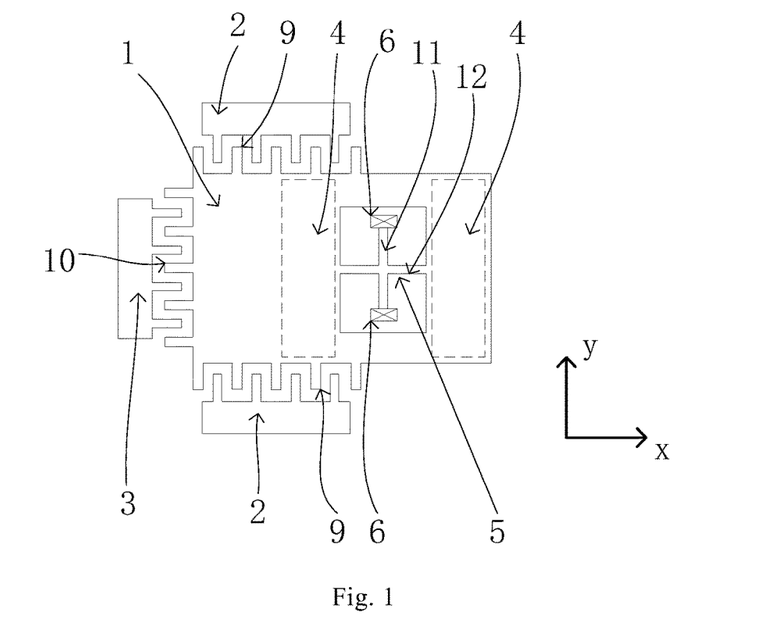
FIG. 1 shows a schematically structural view of an inertial measurement module according to a first embodiment of the present invention.

Referring to FIG. 1, the present invention provides an inertial measurement module in a triaxial accelerometer. The inertial measurement module comprises a substrate (not shown in the drawing) on which a component such as a circuit of the inertial measurement module may be arranged. The substrate is provided with a first pole piece 4 (represented by a dotted line in the drawing) as a lower electrode.

Figure 3:
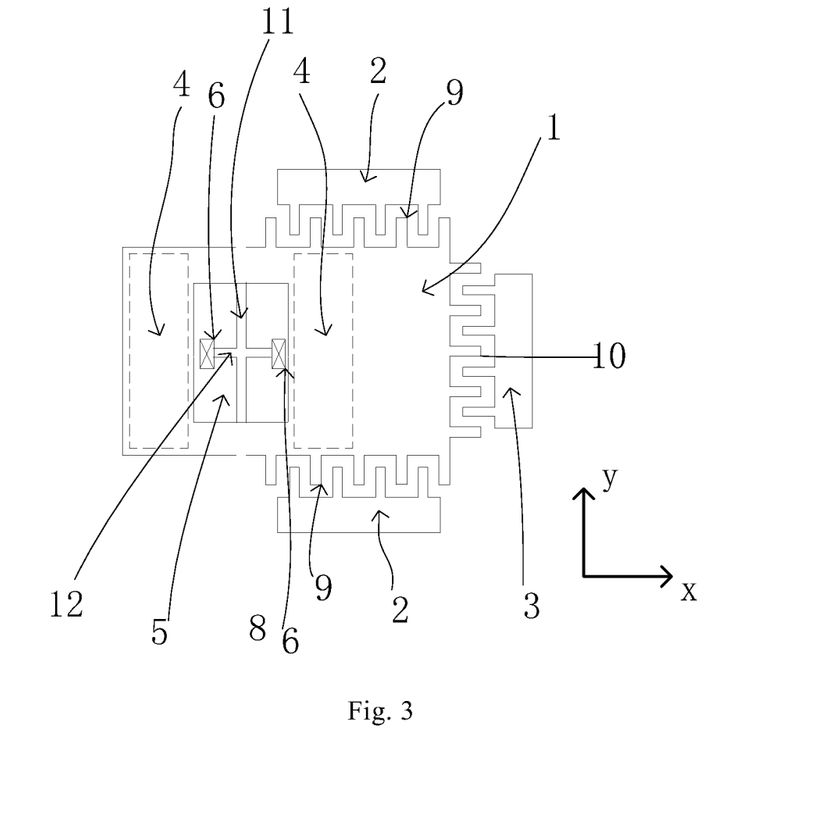
FIG. 3 shows a schematically structural view of the inertial measurement module according to another implementation in the first embodiment of the present invention.

The inertial measurement module provided by the present invention further comprises a mass block 1 located above the substrate and a support system 5 for supporting the mass block 1 above the substrate. The support system 5 is composed of elastic beams comprising a first elastic beam 12 and a second elastic beam 11. The first elastic beam 12 and the second elastic beam 11 are fixed together in a crossed manner; preferably, the fixed connecting point thereof is located in the middles of the two elastic beams; and more preferably, the first elastic beam 12 is located in the X-axis direction and the second elastic beam 11 is located in the Y-axis direction. Two ends of the second elastic beam 11 are connected with anchor points 6 on the substrate, and two ends of the first elastic beam 12 are connected with the mass block 1. The mass block 1 is supported above the substrate via the first elastic beam 12, the second elastic beam 11 and the anchor points 6, so that the mass block 1 is in a suspending state. In a specific embodiment of the present invention, the mass block 1 is provided with a through hole, and the two ends of the first elastic beam 12 are connected with the inner wall of the through hole. Of course, with reference to FIG. 3, the two ends of the first elastic beam 12 may be connected with the anchor points 6 on the substrate, and the two ends of the second elastic beam 11 may be connected with the mass block 1.

It should be noted here that in the present invention, in order to facilitate the description of the relationship between the first elastic beam 12 and the second elastic beam 11, the first elastic beam 12 is defined in the X-axis direction, and the second elastic beam 11 is defined in the Y-axis direction. Certainly, the elastic beam 12 may be defined in the Y-axis direction, and the second elastic beam 11 may be defined in the X-axis direction. They are interchangeable.

In the inertial measurement module provided by the present invention, first movable electrodes 9 and second movable electrodes 10 are arranged in the Y-axis and X-axis directions of the mass block 1, respectively. The movable electrodes are fixed onto the mass block 1. For example, the movable electrodes may be arranged on the edge of the mass block 1, and may be moved synchronously along with the movement of the mass block. Correspondingly, first fixed electrodes 2 for forming a Y-axis detection capacitor with the first movable electrodes 9 and second fixed electrodes 3 for forming an X-axis detection capacitor with the second movable electrodes 10 are arranged on the substrate. The fixed electrodes are fixedly mounted on the substrate. When the movable electrodes are moved along with the mass block 1, an area or distance between the fixed electrode and the corresponding movable electrode is changed, thereby changing the capacitance of the corresponding capacitor, and measuring the acceleration in this direction.

Here, there are two first movable electrodes 9 arranged at the two opposite sides of the mass block 1, respectively. Referring to the view direction of FIG. 1, the two first movable electrodes 9 are arranged at the upper end and the lower end of the mass block 1, respectively. Correspondingly, there are two first fixed electrodes 2 cooperating with the two first movable electrodes 9 are arranged on the substrate. When a Y-axis acceleration exists, the mass block moves in the Y-axis direction, so that an area or distance between one of the first movable electrodes 9 and the corresponding first fixed electrode 2 is increased, while an area or distance between the other first movable electrode 9 and the corresponding first fixed electrode 2 is reduced. Therefore, the two Y-axis detection capacitors form a differential capacitor structure, thereby improving the detection accuracy of the Y-axis acceleration.

Similarly, there may be two second movable electrodes 10 arranged at the two sides of the mass block 1 in the X-axis direction, respectively. Referring to the view direction of FIG. 1, the two second movable electrodes 10 are arranged at the left end and the right end of the mass block 1, respectively. Correspondingly, there are two second fixed electrodes 3 cooperating with the two second movable electrodes 10 arranged on the substrate. When an X-axis acceleration exists, the mass block 1 moves in the X-axis direction, so that an area or distance between one of the second movable electrodes 10 and the corresponding second fixed electrode 3 is increased, while an area or distance between the other second movable electrode 10 and the corresponding second fixed electrode 3 is reduced. Therefore, the two X-axis detection capacitors form a differential capacitor structure, thereby improving the detection accuracy of the X-axis acceleration.

A comb-like capacitor structure may be adopted between the first movable electrodes 9 and the first fixed electrodes 2 and/or between the second movable electrodes 10 and the second fixed electrodes 3. The comb-like capacitor structure belongs to the prior art, and thus its description is omitted herein.

In the inertial measurement module provided by the present invention, the center(s) of the first elastic beam 12 and/or the second elastic beam 11 are/is deviated from the gravity center of the mass block 1, such that the inertial measurement module can deflect relative to the first elastic beam 12 and/or the second elastic beam 11 when being subjected to corresponding external force.

For example, in a specific embodiment of the present invention, the first elastic beam 12 is located on the center line in the X-axis direction of the mass block 1. Referring to the view direction of FIG. 1, that is, the distance from the first elastic beam 12 to the upper end of the block 1 is equal to that from the first elastic beam to the lower end of the mass block 1. The second elastic beam 11 is deviated from the center line in the Y-axis direction of the mass block 1. Referring to the view direction of FIG. 1, that is, the distance from the second elastic beam 11 to the left end of the mass block 1 is unequal to that from the second elastic beam 11 to the right end of the mass block 1. For instance, when the second elastic beam 11 is deviated at the right side of the center line in the Y-axis direction of the mass block 1 and the mass block 1 is subjected to external force in the corresponding direction, the mass block 1 may be rotated relative to the second elastic beam 11 due to the eccentric arrangement between the mass block 1 and the second elastic beam 11.

The mass block 1 is also provided with an upper electrode (not shown in the drawing) for forming a Z-axis detection capacitor with the first pole piece 4. In a preferred embodiment of the present invention, the mass block 1 itself is an upper electrode of the Z-axis detection capacitor. Here, the mass block 1, the first movable electrode 9 and the second movable electrode 10 may be used as grounding electrode pieces of their respective capacitors.

There may be two first pole pieces 4 symmetrically distributed at the two sides of the end of the first elastic beam 12. When a Z-axis direction acceleration exists, the mass block 1 is deflected with respect to the second elastic beam 11. That is, the mass block 1 is rotated around the second elastic beam 11, thereby changing a distance between the mass block 1 and the first pole pieces 4, and realizing the change of the Z-axis detection capacitor. The distance between the mass block 1 and one of the first pole pieces 4 is long, while the distance between the mass block 1 and the other first pole piece 4 is short, so that a differential capacitor structure is formed between the two first pole pieces 4 and the mass block, improving the detection accuracy of the Z-axis acceleration. When a Y-axis direction acceleration exists, the mass block 1 is displaced in the Y-axis direction through the deformation of the first elastic beam 12, so that the Y-axis direction acceleration can be measured via the first movable electrode 9 and the first fixed electrode 2. When an X-axis direction acceleration exists, the mass block 1 is displaced in the X-axis direction through the deformation of the second elastic beam 11, so that the X-axis direction acceleration can be measured via the second movable electrode 10 and the second fixed electrode 3.

In another embodiment of the present invention, it is also possible that the first elastic beam 12 is deviated from the center line in the X-axis direction of the mass block 1. Referring to the view direction of FIG. 1, that is, the distance from the first elastic beam 12 to the upper end of the block 1 is unequal to that from the first elastic beam to the lower end of the mass block 1. The second elastic beam 11 is located on the center line in the Y-axis direction of the mass block 1. Referring to the view direction of FIG. 1, that is, the distance from the second elastic beam 11 to the left end of the mass block 1 is equal to that from the second elastic beam to the right end of the mass block 1. For example, when the first elastic beam 12 is deviated below the center line in the X-axis direction of the mass block 1 and the mass block 1 is subjected to external force in the corresponding direction, the mass block 1 may be rotated relative to the first elastic beam 12 due to the eccentric arrangement between the mass block 1 and the first elastic beam 12.

The two first pole pieces 4 are symmetrically distributed at the two sides of the end of the first elastic beam 11. When a Z-axis direction acceleration exists, the mass block 1 is deflected with respect to the first elastic beam 12. That is, the mass block 1 is rotated around the first elastic beam 12, thereby changing a distance between the mass block 1 and the first pole pieces 4, and realizing the change of the Z-axis detection capacitor. The distance between the mass block 1 and one of the first pole pieces 4 is long, while the distance between the mass block 1 and the other first pole piece 4 is short, so that a differential capacitor structure is formed between the two first pole pieces 4 and the mass block, improving the detection accuracy of the Z-axis acceleration. When a Y-axis direction acceleration exists, the mass block 1 is displaced in the Y-axis direction still via the deformation of the first elastic beam 12, so that the Y-axis direction acceleration can be measured via the first movable electrode 9 and the first fixed electrode 2. When an X-axis direction acceleration exists, the mass block 1 is displaced in the X-axis direction still via the deformation of the second elastic beam 11, so that the X-axis direction acceleration can be measured via the second movable electrode 10 and the second fixed electrode 3.

In the inertial measurement module provided by the present invention, the movement of a certain axis (X-axis and Y-axis) in the plane is not affected by the eccentricity of the structure, so that the movement of the X-axis or the Y-axis is a linear movement, without increasing the coupling between axes. On the other hand, the displacement amount of the mass block in the X-axis and Y-axis directions cannot be reduced, thereby improving the detection accuracy of the capacitor.

The inertial measurement modules provided by the present invention may be combined to form a triaxial accelerometer. For example, the mass blocks 1 in a plurality of inertial measurement modules may be connected via a connecting beam.

Figure 2:
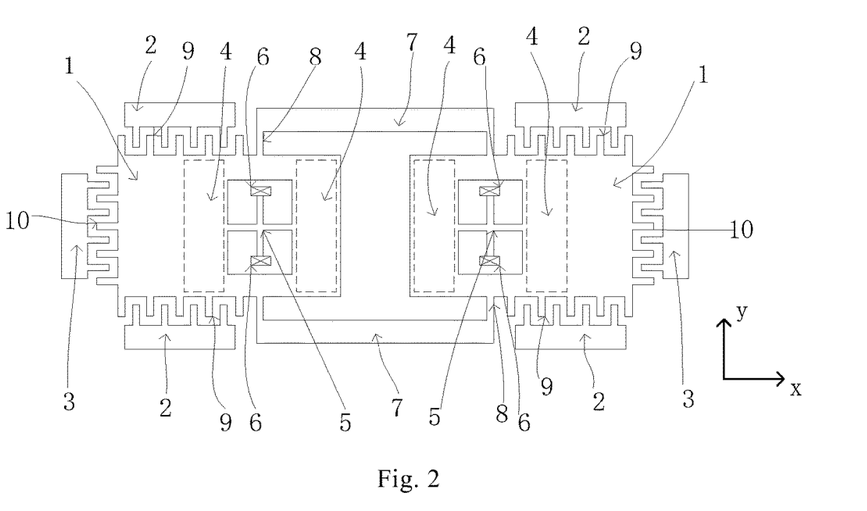
FIG. 2 shows a schematically structural view of a triaxial accelerometer according to the first embodiment of the present invention.

Referring to FIG. 2, for example, the first elastic beam 12 is located on the center line in the X-axis direction of the mass block, and the second elastic beam 11 is deviated from the center line in the Y-axis direction of the mass block. The triaxial accelerometer provided by the present invention includes two structurally symmetric inertial measurement modules, wherein the two inertial measurement modules are connected via a connecting beam. The connecting beam comprises transverse beams 7 located in the X-axis direction, and longitudinal beams 8 located in the Y-axis direction; one end of the longitudinal beam is connected with the corresponding transverse beam 7, and the other end thereof is connected with the side wall of the corresponding mass block 1. The two inertial measurement modules are connected via the transverse beams 7 and the longitudinal beams 8, wherein the two inertial measurement modules may share one substrate. By combining the two inertial measurement modules together, the accuracy of the triaxial accelerometer may be improved. Preferably, the longitudinal beams 8 are collinear with the second elastic beam 11. That is, the longitudinal beams 8 and the second elastic beam 11 are in the same straight line, so that the influence of the longitudinal beams 8 on the rotation of the mass blocks in the Z-axis direction is reduced. Further, the longitudinal beams 8 may be elastic beams.

Embodiment II

Figure 4:
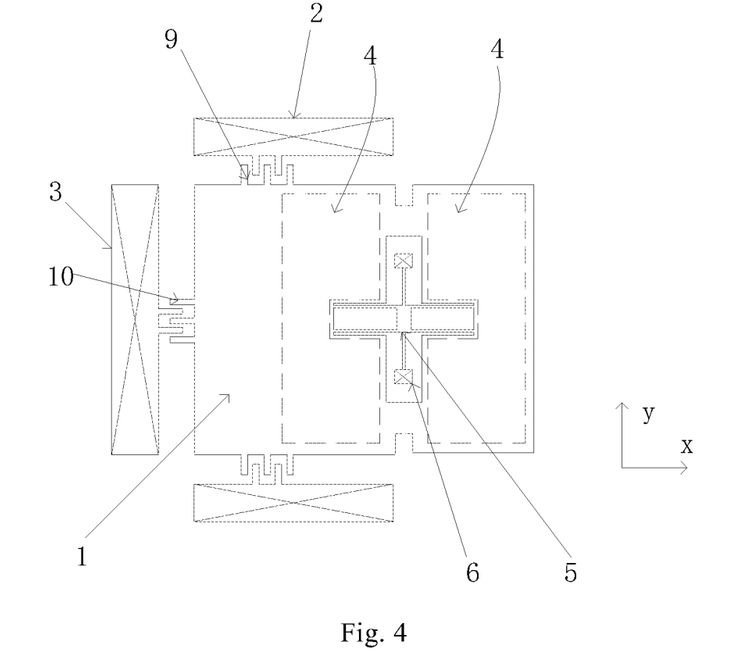
FIG. 4 is a schematically structural view of the inertial measurement module according to a second embodiment of the present invention.

Referring to FIG. 4, the present invention provides an inertial measurement module in a triaxial accelerometer. The inertial measurement module comprises a substrate (not shown in the drawing) on which a component such as a circuit of the inertial measurement module may be arranged. The substrate is provided with a first pole piece 4 (represented by a dotted line in the drawing) as a lower electrode.

The inertial measurement module provided by the present invention further comprises a mass block 1 located above the substrate and a support system 5 for supporting the mass block 1 above the substrate. The support system 5 may be composed of elastic beams through which the mass block 1 is supported above the substrate in a suspending manner.

Figure 5:
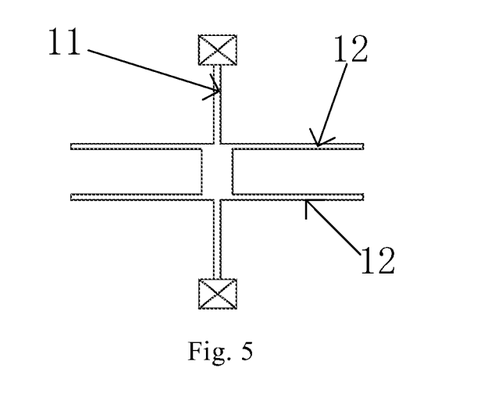
FIG. 5 is a schematically structural view of an elastic beam in FIG. 4.

Referring to FIG. 5, the elastic beams comprise two first elastic beams 12 in the X-axis direction and a second elastic beam 11 in the Y-axis direction; and the two first elastic beams 12 and the second elastic beam 11 are fixed together in a crossed manner. That is, the second elastic beam 11 is fixed to the two first elastic beams 12 parallel to each other in a crossed manner, respectively. Preferably, the two first elastic beams 12 are symmetrically distributed with respect to the center of the second elastic beam 11.

Here, two ends of the second elastic beam 11 are connected with anchor points 6 on the substrate, and the two first elastic beams 12 are connected with the mass block 1. The mass block 1 is supported above the substrate via the first elastic beams 12, the second elastic beam 11 and the anchor points 6, so that the mass block 1 is in a suspending state. In a specific embodiment of the present invention, the mass block 1 is provided with a through hole, and the two ends of the first elastic beam 12 are connected with the side walls at the two sides of the through hole, respectively.

It should be noted here that in the present invention, in order to facilitate the description of the relationship between the first elastic beams 12 and the second elastic beam 11, the first elastic beams 12 are defined in the X-axis direction, and the second elastic beam 11 is defined in the Y-axis direction. Certainly, the first elastic beams 12 may be defined in the Y-axis direction, and the second elastic beam 11 may be defined in the X-axis direction They are interchangeable.

In the inertial measurement module provided by the present invention, first movable electrodes 9 and second movable electrodes 10 are arranged in the Y-axis and X-axis directions of the mass block 1, respectively. The movable electrodes are fixed onto the mass block 1. For example, the movable electrodes may be arranged on the edge of the mass block 1, and may be moved synchronously along with the movement of the mass block. Correspondingly, first fixed electrodes 2 for forming a Y-axis detection capacitor with the first movable electrodes 9 and second fixed electrodes 3 for forming an X-axis detection capacitor with the second movable electrodes 10 are arranged on the substrate. The fixed electrodes are fixedly mounted on the substrate. When the movable electrodes are moved along with the mass block 1, an area or distance between the fixed electrode and the corresponding movable electrode is changed, thereby changing the capacitance of the corresponding capacitor, and measuring the acceleration in this direction.

Here, there are two first movable electrodes 9 arranged at the two opposite sides of the mass block 1, respectively. Referring to the view direction of FIG. 4, the two first movable electrodes 9 are arranged at the upper end and the lower end of the mass block 1, respectively. Correspondingly, the two first fixed electrodes 2 cooperating with the two first movable electrodes 9 are arranged on the substrate. When a Y-axis acceleration exists, the mass block moves in the Y-axis direction, so that an area or distance between one of the first movable electrode 9 and the corresponding first fixed electrode 2 is increased, while an area or distance between the other first movable electrode 9 and the corresponding first fixed electrode 2 is reduced. Therefore, the two Y-axis detection capacitors form a differential capacitor structure, thereby improving the detection accuracy of the Y-axis acceleration.

Similarly, there may be two second movable electrodes 10 arranged at the two sides of the mass block 1 in the X-axis direction, respectively. Referring to the view direction of FIG. 4, the two second movable electrodes 10 are arranged at the left end and the right end of the mass block 1, respectively. Correspondingly, there are two second fixed electrodes 3 cooperating with the two second movable electrodes 10 arranged on the substrate. When an X-axis acceleration exists, the mass block 1 moves in the X-axis direction, so that an area or distance between one of the second movable electrode 10 and the corresponding second fixed electrode 3 is increased, while an area or distance between the other second movable electrode 10 and the corresponding second fixed electrode 3 is reduced. Therefore, the two X-axis detection capacitors form a differential capacitor structure, thereby improving the detection accuracy of the X-axis acceleration.

A comb-like capacitor structure may be adopted between the first movable electrodes 9 and the first fixed electrodes 2 and/or between the second movable electrodes 10 and the second fixed electrodes 3. The comb-like capacitor structure belongs to the prior art, and thus its description is omitted herein.

In the inertial measurement module provided by the present invention, the two first elastic beams 12 are symmetrically distributed along the center line in the X-axis direction of the mass block, and the second elastic beam 11 is deviated from the center line in the Y-axis direction of the mass block. When the inertia measurement module is subjected to the acceleration in the Z-axis direction, the mass block 1 is deflected by taking the second elastic beam 11 as the axis due to the eccentric arrangement of the second elastic beam 11.

Particularly, referring to the view direction of FIG. 4, the two first elastic beams 12 are symmetrically distributed with respect to the center line in the X-axis direction of the mass block, and the second elastic beam 11 is deviated from the center line in the Y-axis direction of the mass block. That is, the distance from the second elastic beam 11 to the left end of the mass block 1 is unequal to that from the second elastic beam to the right end of the mass block 1. For example, when the second elastic beam 11 is deviated at the right side of the center line in the Y-axis direction of the mass block, and the mass block 1 is subjected to acceleration in the Z-axis direction, the mass block 1 may be rotated relative to the second elastic beam 11 due to the eccentric arrangement between the mass block 1 and the second elastic beam 11.

The mass block 1 is also provided with an upper electrode (not shown in the drawing) for forming a Z-axis detection capacitor with the first pole piece 4. In a preferred embodiment of the present invention, the mass block 1 itself is an upper electrode of the Z-axis detection capacitor. Here, the mass block 1, the first movable electrode 9 and the second movable electrode 10 may be used as grounding electrode pieces of their respective capacitors.

There may be two first pole pieces 4 symmetrically distributed at the two sides of the second elastic beam 11. When a Z-axis direction acceleration exists, the mass block 1 is deflected with respect to the second elastic beam 11. That is, the mass block 1 is rotated around the second elastic beam 11, thereby changing a distance between the mass block 1 and the first pole pieces 4, and realizing the change of the Z-axis detection capacitor. The distance between the mass block 1 and one of the first pole pieces 4 is long, while the distance between the mass block 1 and the other first pole piece 4 is short, so that a differential capacitor structure is formed between the two first pole pieces 4 and the mass block, improving the detection accuracy of the Z-axis acceleration. When a Y-axis direction acceleration exists, the mass block 1 is displaced in the Y-axis direction through the deformation of the first elastic beam 12, so that the Y-axis direction acceleration can be measured via the first movable electrode 9 and the first fixed electrode 2. When an X-axis direction acceleration exists, the mass block 1 is displaced in the X-axis direction through the deformation of the second elastic beam 11, so that the X-axis direction acceleration can be measured via the second movable electrode 10 and the second fixed electrode 3.

In the inertial measurement module provided by the present invention, the movement of a certain axis (X axis or Y axis) in the plane is not affected by the eccentricity of the structure. Moreover, the two first elastic beams symmetrically arranged along the center line in the X-axis direction of the mass blocks are adopted to connect the mass blocks, so that no matter which direction the acceleration to the mass blocks is in, it is ensured that the mass blocks will not deflect along the first elastic beams, and there is only linear movement between the mass blocks and the first elastic beams, improving the detection accuracy, and avoiding the increase of coupling between the axes.

The inertial measurement modules provided by the present invention may be combined to form a triaxial accelerometer. For example, the mass blocks 1 in a plurality of inertial measurement modules may be connected via a connecting beam.

Figure 6:
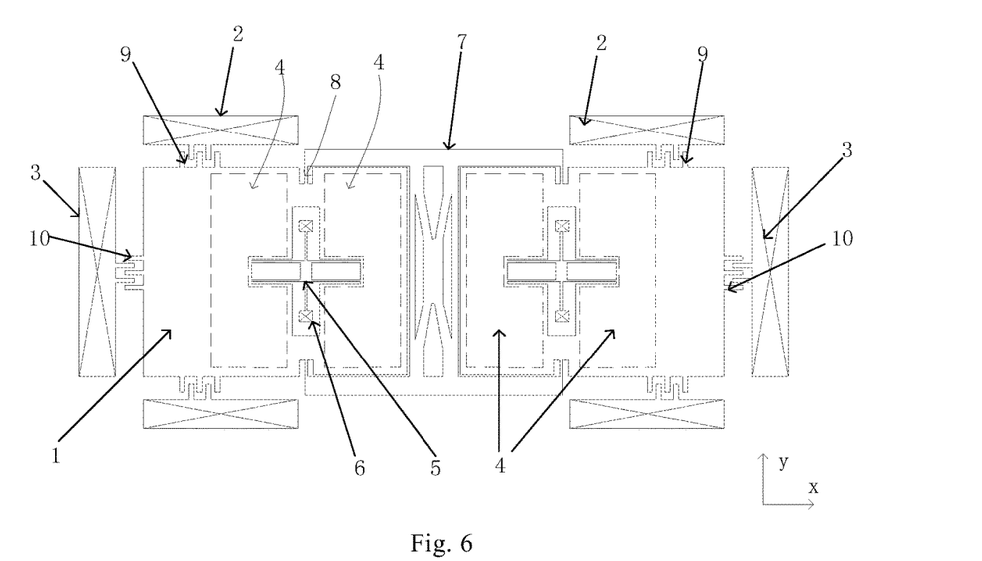
FIG. 6 is a schematically structural view of the triaxial accelerometer according to the second embodiment of the present invention.

Referring to FIG. 6, the present invention discloses a triaxial accelerometer which comprises two structurally symmetric inertial measurement modules, and adopts two connecting beams for connecting two sides of the mass blocks 1 in the two inertial measurement modules, respectively. The connecting beams comprise transverse beams 7 located in the X-axis direction and longitudinal beams 8 located in the Y-axis direction; and one end of the longitudinal beam is connected with the corresponding transverse beam 7, and the other end thereof is connected with the side wall of the corresponding mass block 1. The longitudinal beams 8 are collinear with the second elastic beams 11. That is, the longitudinal beams 8 and the second elastic beams 11 are in the same line, so as to reduce the influence of the longitudinal beams 8 on the rotation of the mass blocks in the Z-axis direction. Further, the longitudinal beams 8 may be made of a non-rigid material.

Referring to the view direction of FIG. 6, the transverse beam 7 and the longitudinal beam 8 at the upper part connect the side walls of the upper ends of the two mass blocks 1. The transverse beam 7 and the longitudinal beam 8 at the lower part connect the side walls of the lower ends of the two mass blocks 1. A rigid reinforcing beam 130 is further arranged between the two transverse beams 7, and is configured to connect the two transverse beams 7. Through the locations of the reinforcing beam 130 on the two transverse beams 7, the second elastic beams 11 in the two inertial measurement modules are symmetrically distributed with respect to the reinforcing beam 130.

In the triaxial accelerometer provided by the present invention, when being subjected to the acceleration in the Z-axis direction, the mass blocks 1 are deflected with respect to the second elastic beams 11 due to the eccentric arrangement between the mass blocks 1 and the second elastic beams 11, and detection is performed via the two first pole pieces 4. When being subjected to the acceleration in the X-axis direction, the mass blocks 1 can only be translated in the X-axis direction due to the action of the transverse beams 7, the longitudinal beams 8, the reinforcing beam 130 and the two first elastic beams 12, so that the detection accuracy in the X-axis direction is improved. When the mass blocks receive the acceleration in the Y-axis direction, as the second elastic beams 11 are symmetrically distributed with respect to the reinforcing beam 130, the gravity center and the geometric gravity center of the Z-axis structure are overlapped; and moreover, the mass blocks 1 are connected via the two first elastic beams 12, so that it is ensured that the mass blocks can only be translated in the Y-axis direction, without twisting.

In order to further improve the twisting resistance of the connecting beams, there are two reinforcing beams 130 parallel to each other, and form a rectangular frame with the transverse beams 7. Further, referring to FIG. 7, the triaxial accelerometer also comprises two cant beams 131 located in the rectangular frame, and the two cant beams 131 are diagonally distributed in the rectangular frame.

Embodiment III

Figure 8:
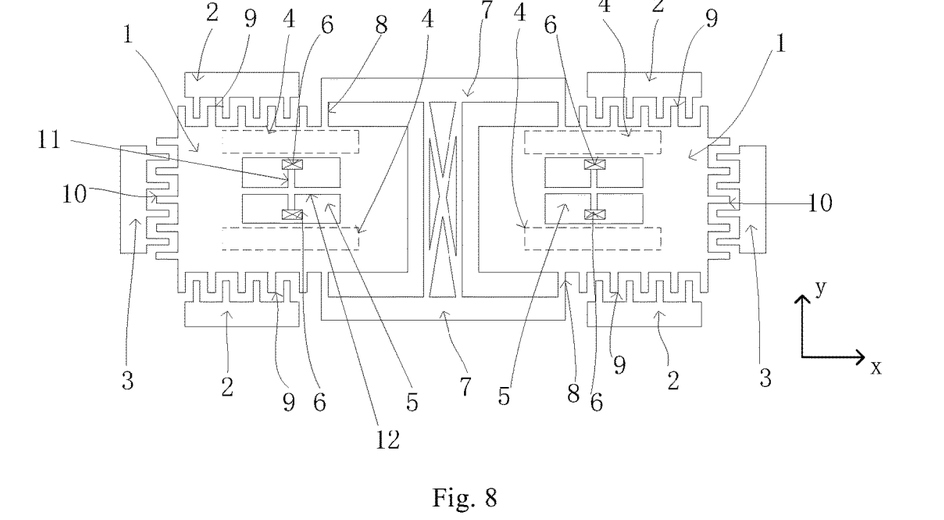
FIG. 8 shows a schematically structural view of the triaxial accelerometer according to a third embodiment of the present invention.

Referring to FIG. 8, the present invention provides a Z-axis structure in an accelerometer. The Z-axis structure comprises two structurally symmetric inertial measurement modules. Each inertial measurement module comprises a substrate (not shown in the drawing) on which a component such as a circuit of the inertial measurement module may be arranged. The substrate is provided with a first pole piece 4 (represented by a dotted line in the drawing) as a lower electrode.

Figure 9:
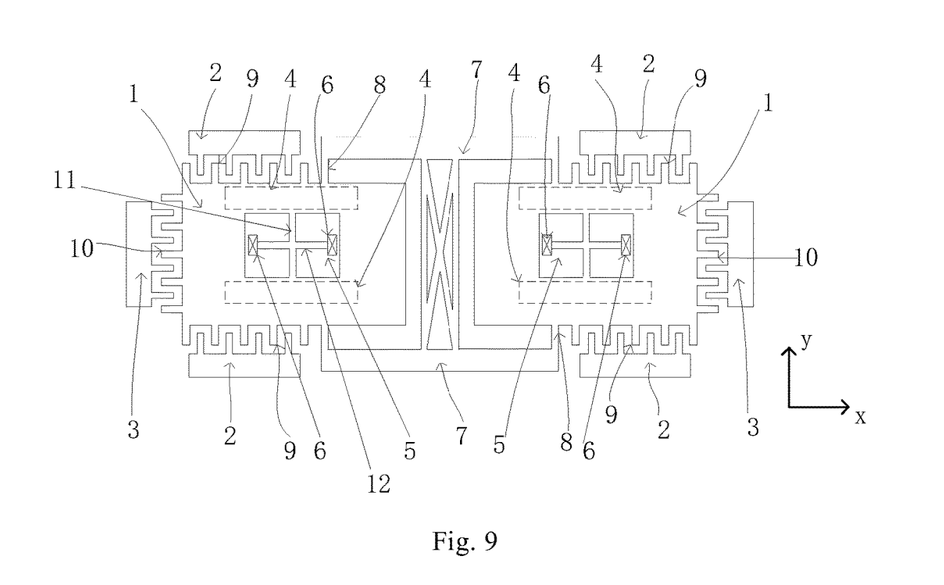
FIG. 9 shows a schematically structural view of the triaxial accelerometer according to another implementation in the third embodiment of the present invention.

The inertial measurement module further comprises a mass block 1 located above the substrate and a support system 5 for supporting the mass block 1 above the substrate. The support system 5 is composed of elastic beams comprising a first elastic beam 12 and a second elastic beam 11. The first elastic beam 12 and the second elastic beam 11 are fixed together in a crossed manner. Preferably, the fixed connecting point is located in the middles of the two elastic beams, wherein the first elastic beam 12 is located in the X-axis direction and the second elastic beam 11 is located in the Y-axis direction. Two ends of the second elastic beam 11 are connected with anchor points 6 on the substrate, and two ends of the first elastic beam 12 are connected with the mass block 1. The mass block 1 is supported above the substrate via the first elastic beam 12, the second elastic beam 11 and the anchor points 6, so that the mass block 1 is in a suspending state. In a specific embodiment of the present invention, the mass block 1 is provided with a through hole, and the two ends of the first elastic beam 12 are connected with the inner wall of the through hole. Referring to FIG. 9, in another embodiment of the present invention, the two ends of the first elastic beam 12 are connected with the anchor points 6 on the substrate, and the two ends of the second elastic beam 11 are connected with the mass block 1.

It should be noted here that in the present invention, in order to facilitate the description of the relationship between the first elastic beam 12 and the second elastic beam 11, the first elastic beam 12 is defined in the X-axis direction, and the second elastic beam 11 is defined in the Y-axis direction. Certainly, the first elastic beam 12 may be defined in the Y-axis direction, and the second elastic beam 11 may be defined in the X-axis direction They are interchangeable.

In the Z-axis structure provided by the present invention, the first elastic beams 12 are deviated from the center lines in the X-axis direction of the mass blocks, so that the inertial measurement modules can be deflected with respect to the first elastic beams 12 when being subjected to external force in the Z-axis direction. Referring to the view direction of FIG. 8, that is, the distances from the first elastic beams 12 to the upper ends of the mass blocks 1 are unequal to those from the first elastic beams to the lower ends of the mass blocks 1. For example, when the first elastic beams 12 are deviated above the center lines in the X-axis direction of the mass blocks and the mass blocks 1 are subjected to external force in the Z-axis direction, the mass blocks 1 may be rotated relative to the first elastic beams 12 due to the eccentric arrangement between the mass blocks 1 and the first elastic beams 12.

The mass block 1 is also provided with an upper electrode (not shown in the drawing) for forming a Z-axis detection capacitor with the first pole piece 4. In a preferred embodiment of the present invention, the mass block 1 itself is an upper electrode of the Z-axis detection capacitor. Here, the mass block 1 may be used as a grounding electrode piece of the capacitor.

Preferably, there may be two first pole pieces 4 distributed at the two sides of the second elastic beam 11. When a Z-axis direction acceleration exists, the mass block 1 is deflected with respect to the first elastic beam 12. That is, the mass block 1 is rotated around the first elastic beam 12, thereby changing a distance between the mass block 1 and the first pole pieces 4, and realizing the change of the Z-axis detection capacitor. The distance between the mass block 1 and one of the first pole pieces 4 is long, while the distance between the mass block 1 and the other first pole piece 4 is short, so that a differential capacitor structure is formed between the two first pole pieces 4 and the mass block, improving the detection accuracy of the Z-axis acceleration.

The Z-axis structure provided by the present invention further includes a connecting beam for connecting two sides of the mass blocks 1 in the two inertial measurement modules, respectively. The connecting beam comprises transverse beams 7 located in the X-axis direction and longitudinal beams 8 located in the Y-axis direction; and one end of the longitudinal beam is connected with the corresponding transverse beam 7, and the other end thereof is connected with the side wall of the corresponding mass block 1. In order to reduce the influence of the longitudinal beams 8 on the rotation of the mass blocks in the Z-axis direction, the longitudinal beams 8 may be elastic beams.

Referring to FIG. 8, the transverse beam 7 and the longitudinal beam 8 at the upper part connect the side walls of the upper ends of the two mass blocks 1. The transverse beam 7 and the longitudinal beam 8 at the lower part connect the side walls of the lower ends of the two mass blocks 1. A reinforcing beam 130 is further arranged between the two transverse beams 7, and is configured to connect the two transverse beams 7. Through the locations of the reinforcing beam on the two transverse beams 7, the second elastic beams 11 in the two inertial measurement modules are symmetrically distributed with respect to the reinforcing beam 130. Here, selectively, the second elastic beams 11 may be arranged on the center lines in the Y-axis direction of the mass blocks 1, or may be deviated from the center lines thereof.

In the Z-axis structure provided by the present invention, when being subjected to the acceleration in the Z-axis direction, the mass blocks 1 are deflected with respect to the second elastic beams 12 due to the eccentric arrangement between the mass blocks 1 and the second elastic beams 12, and detection is performed via the two first pole pieces 4. When being subjected to the acceleration in the X-axis direction, due to the action of the transverse beams 7, the longitudinal beams 8, the reinforcing beam 130 and the two first elastic beams 12, the mass blocks 1 are prevented from twisting caused by the eccentric arrangement, and can only be translated in the X-axis direction, so that the detection accuracy in the X-axis direction is improved. When the mass blocks receive the acceleration in the Y-axis direction, as the second elastic beams 11 are symmetrically distributed with respect to the reinforcing beam 130, the gravity center and the geometric gravity center of the Z-axis structure are overlapped, and it is ensured that the mass blocks can only be translated in the Y-axis direction, without twisting.

Figure 7:
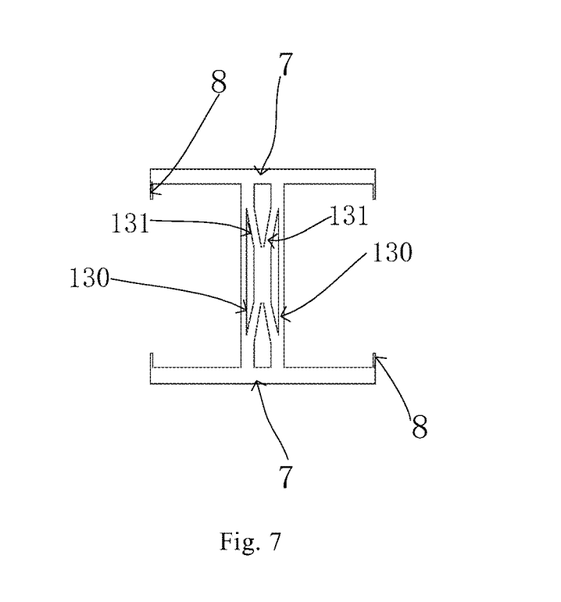
FIG. 7 is a schematically structural view of a connecting beam in FIG. 6.

Similar to the embodiment II, in order to further improve the twisting resistance of the connecting beams, there may be two reinforcing beams 130 parallel to each other, and form a rectangular frame with the transverse beams 7. Referring to FIG. 7, further, the Z-axis structure also comprises two cant beams 131 diagonally connected with the rectangular frame.

In another embodiment of the present invention, there is provided a triaxial accelerometer. The triaxial accelerometer comprises the above Z-axis structure, wherein first movable electrodes 9 and second movable electrodes 10 are arranged in the Y-axis and X-axis directions of the mass block 1, respectively. The movable electrodes are fixed onto the mass block 1. For example, the movable electrodes may be arranged on the edge of the mass block 1, and may be moved synchronously along with the movement of the mass block. Correspondingly, first fixed electrodes 2 for forming a Y-axis detection capacitor with the first movable electrodes 9 and second fixed electrodes 3 for forming an X-axis detection capacitor with the second movable electrodes 10 are arranged on the substrate. The fixed electrodes are fixedly mounted on the substrate. When the movable electrodes are moved along with the mass block 1, an area or distance between the fixed electrode and the corresponding movable electrode is changed, thereby changing the capacitance of the corresponding capacitor, and measuring the acceleration in this direction.

Here, there are two first movable electrodes 9 arranged at the two opposite sides of the mass block 1, respectively. Referring to the view direction of FIG. 8, the two first movable electrodes 9 are arranged at the upper end and the lower end of the mass block 1, respectively. Correspondingly, the two first fixed electrodes 2 cooperating with the two first movable electrodes 9 are arranged on the substrate. When a Y-axis acceleration exists, the mass block moves in the Y-axis direction, so that an area or distance between one of the first movable electrodes 9 and the corresponding first fixed electrode 2 is increased, while an area or distance between the other first movable electrode 9 and the corresponding first fixed electrode 2 is reduced. Therefore, the two Y-axis detection capacitors form a differential capacitor structure, thereby improving the detection accuracy of the Y-axis acceleration.

Similarly, there may be two second movable electrodes 10 arranged at the two sides of the mass block 1 in the X-axis direction, respectively. Referring to the view direction of FIG. 8, the two second movable electrodes 10 are arranged at the left end and the right end of the mass block 1, respectively. Correspondingly, there are two second fixed electrodes 3 cooperating with the two second movable electrodes 10 arranged on the substrate. When an X-axis acceleration exists, the mass block 1 moves in the X-axis direction, so that an area or distance between one of the second movable electrodes 10 and the corresponding second fixed electrode 3 is increased, while an area or distance between the other second movable electrode 10 and the corresponding second fixed electrode 3 is reduced. Therefore, the two X-axis detection capacitors form a differential capacitor structure, thereby improving the detection accuracy of the X-axis acceleration.

A comb-like capacitor structure may be adopted between the first movable electrodes 9 and the first fixed electrodes 2 and/or between the second movable electrodes 10 and the second fixed electrodes 3. The comb-like capacitor structure belongs to the prior art, and thus its description is omitted herein.

When a Y-axis direction acceleration exists, the mass block 1 is displaced in the Y-axis direction through the deformation of the first elastic beam 12, so that the Y-axis direction acceleration can be measured via the first movable electrode 9 and the first fixed electrode 2. When an X-axis direction acceleration exists, the mass block 1 is displaced in the X-axis direction through the deformation of the second elastic beam 11, so that the X-axis direction acceleration can be measured via the second movable electrode 10 and the second fixed electrode 3.

In the triaxial accelerometer provided by the present invention, the movement of a certain axis (X-axis and Y-axis) in the plane is not affected by the eccentricity of the structure, so that the movement of the X-axis or the Y-axis is a linear movement, without increasing the coupling between axes. On the other hand, the displacement amount of the mass block in the X-axis and Y-axis directions cannot be reduced, thereby improving the detection accuracy of a capacitor.

The present invention is described in detail with reference to preferred embodiments. However, it is obvious to those skilled in the art for the changes and additions of the various embodiments through the study of the foregoing description. The intention of the applicant is that all such changes and additions shall fall within the protective scope of the present invention defined by the claims.

The invention claimed is:

1. A triaxial accelerometer, comprising:
   two structurally symmetric inertial measurement modules; and
   a connecting beam for connecting mass blocks in the two inertial measurement modules,
   wherein each one of the two inertial measurement modules comprises:
   a substrate;
   a first pole piece, as a lower electrode, located on the substrate;
   a mass block suspended above the substrate, an upper electrode for forming a Z-axis detection capacitor with the first pole piece being arranged on the mass block; and
   elastic beams configured to connect the substrate with the mass block, wherein the elastic beams comprise a first elastic beam located in the X-axis direction and a second elastic beam located in the Y-axis direction and cross-connected with the first elastic beam; two ends of the second elastic beam are connected with anchor points on the substrate and two ends of the first elastic beam are connected with the mass block, or the two ends of the first elastic beam are connected with the anchor points on the substrate and the two ends of the second elastic beam are connected with the mass block; the center(s) of the first elastic beam and/or the second elastic beam are/is deviated from the gravity center of the mass block,
   wherein the mass block is further provided with a first movable electrode and a second movable electrode in the Y-axis and X-axis directions, respectively; and the substrate is provided with a first fixed electrode configured to form a Y-axis detection capacitor with the first movable electrode, and a second fixed electrode configured to form an X-axis detection capacitor with the second movable electrode,
   wherein the connecting beam comprises transverse beams located in the X-axis direction, and longitudinal beams located in the Y-axis direction; one end of the longitudinal beam is connected with the corresponding transverse beam, and the other end thereof is connected with the side wall of the corresponding mass block;
   and the longitudinal beams and the second elastic beams are in the same straight line, and
   wherein the first elastic beam is located on the center line in the X-axis direction of the mass block, and the second elastic beam is deviated from the center line in the Y-axis direction of the mass block.

2. The triaxial accelerometer of claim 1, wherein there are two first elastic beams symmetrically distributed along the center line in the X-axis direction of the mass block, and the second elastic beams are deviated from the center line in the Y-axis direction of the mass block.

3. The triaxial accelerometer of claim 1, further comprising:
   reinforcing beams for connecting the two transverse beams,
   wherein the second elastic beams in the two inertial measurement modules are symmetrically distributed with respect to the reinforcing beams.

4. The triaxial accelerometer of claim 3, wherein:
   two reinforcing beams are provided parallel to each other, and
   the two reinforcing beams and the transverse beams form a rectangular frame.

5. The triaxial accelerometer of claim 4, further comprising a cant beam located in the rectangular frame.

6. The triaxial accelerometer of claim 1, wherein:
   the first elastic beams of at least one of the two structurally symmetric inertial measurement modules are deviated from center lines in the X-axis direction of the mass blocks; and
   the triaxial accelerometer further comprises reinforcing beams for connecting the two transverse beams, wherein the second elastic beams in the two inertial measurement modules are symmetrically distributed with respect to the reinforcing beams.

7. The triaxial accelerometer of claim 6, wherein there are two reinforcing beams parallel to each other, and the two reinforcing beams and the transverse beams form a rectangular frame.

8. The triaxial accelerometer of claim 6, wherein there are two reinforcing beams parallel to each other, and the two reinforcing beams and the transverse beams form a rectangular frame.

9. A triaxial accelerometer comprising:
two structurally symmetric inertial measurement modules each comprising:
  a substrate;
  a first pole piece, as a lower electrode, located on the substrate;
  a mass block suspended above the substrate, an upper electrode for forming a Z-axis detection capacitor with the first pole piece being arranged on the mass block; and
  elastic beams configured to connect the substrate with the mass block, wherein the elastic beams comprise a first elastic beam located in the X-axis direction and a second elastic beam located in the Y-axis direction and cross-connected with the first elastic beam; two ends of the second elastic beam are connected with anchor points on the substrate and two ends of the first elastic beam are connected with the mass block, or the two ends of the first elastic beam are connected with the anchor points on the substrate and the two ends of the second elastic beam are connected with the mass block; the center(s) of the first elastic beam and/or the second elastic beam are/is deviated from the gravity center of the mass block,
  wherein the mass block is further provided with a first movable electrode and a second movable electrode in the Y-axis and X-axis directions, respectively; and the substrate is provided with a first fixed electrode configured to form a Y-axis detection capacitor with the first movable electrode, and a second fixed electrode configured to form an X-axis detection capacitor with the second movable electrode,
  wherein the first elastic beams of each of the two structurally symmetric inertial measurement modules is deviated from center lines in the X-axis direction of the mass blocks;
a connecting beam for connecting two sides of the mass blocks in the two inertial measurement modules, respectively, the connecting beam comprising transverse beams located in the X-axis direction and longitudinal beams located in the Y-axis direction, one end of the longitudinal beam being connected with the corresponding transverse beam, and the other end thereof being connected with the side wall of the corresponding mass block; and
reinforcing beams for connecting the two transverse beams, wherein the second elastic beams in the two inertial measurement modules are symmetrically distributed with respect to the reinforcing beams.

\* \* \* \* \*